UNITED STATES PATENT OFFICE.

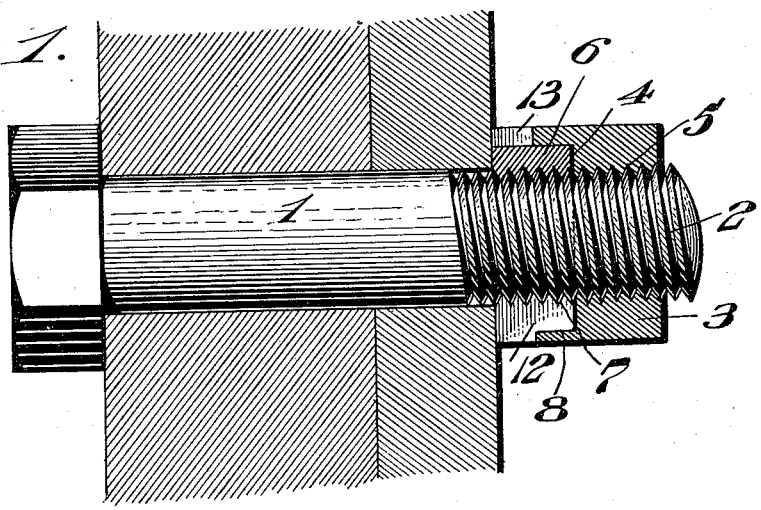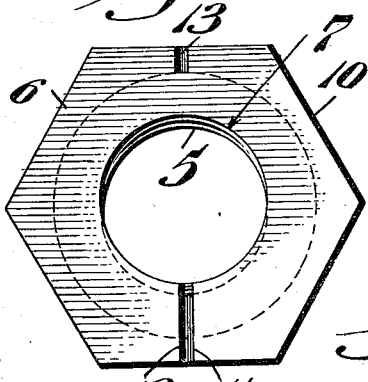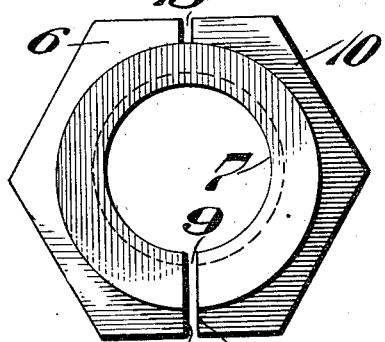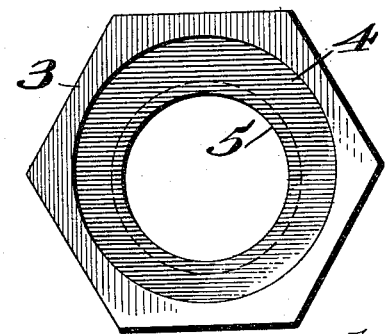

ALLISON M. MacFARLAND, OF PHILADELPHIA, PENNSYLVANIA, ASSIGNOR TO AUTO NOVELTY COMPANY, A CORPORATION OF DELAWARE.

NUT-LOCK.

1,015,571.         Specification of Letters Patent.          Patented Jan. 23, 1912.

Application filed March 9, 1909, Serial No. 482,298. Renewed June 3, 1911. Serial No. 631,089.

*To all whom it may concern:*

Be it known that I, ALLISON M. MACFARLAND, a citizen of the United States, residing in the city and county of Philadelphia, State of Pennsylvania, have invented a new and useful Nut-Lock, of which the following is a specification.

This invention relates to an improvement in nut-locks and has for an object to provide a simple and efficient device for securely locking a nut to a bolt or the like after the two parts have been properly adjusted.

It consists of a plurality of members adapted to fit together and so coöperating as to produce a binding or gripping action which acts to prevent a relative movement between the parts when in certain positions.

For the purpose of illustrating my invention, I have shown in the accompanying drawings one form thereof which is at present preferred by me, since the same has been found in practice to give satisfactory and reliable results although it is to be understood that the various instrumentalities of which my invention consists can be variously arranged and organized and that my invention is not limited to the precise arrangement and organization of these instrumentalities as herein shown and described.

Figure 1 represents a longitudinal section through my novel nut-lock in operative position. Fig. 2 represents a front elevation of the nut. Fig. 3 represents a front elevation of one of the elements thereof. Fig. 4 represents a similar view of the coöperating member.

Similar numerals of reference indicate corresponding parts in the figures.

Referring to the drawings:—1 designates a bolt which may be of usual construction and in the present instance is provided with the threaded shank 2 adapted to receive a nut 3, forming, as herein disclosed, one of the elements of my novel locking device. Preferably the nut 3 is provided with a circular counterbore 4 encircling the usual bolt opening 5 passing through the center of the nut 3. The counterbore 4 is eccentrically formed relative to the center of the bolt opening 5, for a purpose to be later described.

The coöperating or locking nut 6 is provided with a threaded opening 7 for the thread 2 of the bolt 1 and with a circular boss 8 eccentric to said opening and corresponding to the counterbore 4. The nut 6 is further slitted entirely through at 9 preferably upon the heavy side of the boss and extending into the threaded opening 7 so that the adjoining portions of this locking nut can be compressed together to reduce the size of the threaded opening at the same time that angular movement within the nut 3 wedges the heavier part of the boss into the smaller part of the counterbore, by reason of the eccentricity of boss and counterbore to the threaded opening. There is also an axial wedging or jamming action between the nut 3 and the locking nut 6 due to the relative axial movement of the two when the lock nut 6 is turned angularly within the nut 3.

The slitting at 9 not only permits movement of the adjoining parts of the lock nut toward or away from each other but affords a hold for a spanner wrench whose illustration I have considered unnecessary and by which the lock nut 6 can readily be turned relatively to the nut 3. It will be evident that the lock nut 6 might be turned by a wrench engaging with its sides 10, preferably of hexagonal shape, where they are accessible as best seen in Fig. 1. The object is much the same in either case with the difference that a wrench fitting the sides would exert turning moment upon each of the sides about the nut where the spanner wrench would bring pressure upon a particular portion of the nut.

In order to permit spring of the sides of the lock nut 6 to vary the distance between the faces 11 and 12 thereof where the nut is slitted at 9 and also to provide an additional spanner hold upon the nut I provide one or more slits 13. When but one is provided I prefer to place it as shown directly opposite the slit 9.

I assemble the parts by putting the nut 3 and lock nut 6 on together with the central openings thereof in agreement, the heavy sides of the eccentric boss and counterbore corresponding and preferably the faces of the sides of the nut and lock nut also corresponding. Since these matching faces can be held by the same wrench while the nut is being put on or both held by hand if it pass upon the bolt easily enough for this the desired relation of the nut and lock nut may be maintained, not only during the initial placing of both but during the tightening of the nut and lock nut ready for the special locking function attained by my invention. The lock nut is then turned relatively to the nut 3 wedging the lock nut 6 inwardly tightly against the bolt at the same time that it moves longitudinally with respect to the nut 3 obtaining the double locking function.

Having thus described my invention, what I claim as new and desire to secure by Letters Patent, is:—

1. A two piece nut lock comprising a nut having a counterbore eccentric to the opening therein, and a split nut having a boss eccentric to its opening and fitting the counterbore.

2. In a lock nut, an eccentrically counterbored nut in combination with an eccentrically bossed nut fitting the counterbore and slitted through the heavy side of the boss.

ALLISON M. MacFARLAND.

Witnesses:
WM. CANER WIEDERSEIM,
W. T. JACKSON.

---

Copies of this patent may be obtained for five cents each, by addressing the "Commissioner of Patents, Washington, D. C."